United States Patent [19]

Nikolaev et al.

[11] 4,067,400

[45] Jan. 10, 1978

[54] PNEUMATIC HAMMER

[76] Inventors: Igor Vladimirovich Nikolaev, ulitsa Fadeeva, 5, kv. 37; Leonid Avrumovich Gornik, ulitsa Krasny Kazanets, 3, korpus 5, kv. 139; Anatoly Ivanovich Lednikov, Korovinskoe shosse, 9, korpus 2, kv. 51, all of Moscow; Lidia Mikhailovna Dronova, ulitsa Kalarash, 5, kv. 68, Ljubertsy Moskovskoi oblasti, all of U.S.S.R.

[21] Appl. No.: 709,730

[22] Filed: July 29, 1976

[51] Int. Cl.[2] .................. B23B 5/34

[52] U.S. Cl. .................. 173/134; 279/19.3

[58] Field of Search .................. 173/134, 162; 279/19, 279/19.1-19.7, 86, 97

[56] References Cited

U.S. PATENT DOCUMENTS

| | | | |
|---|---|---|---|
| 1,349,641 | 8/1920 | Wathen | 173/162 |
| 1,575,792 | 3/1926 | Prellwitz | 279/19.5 |
| 1,668,829 | 5/1928 | Stevens | 279/19.6 |
| 1,784,012 | 12/1930 | Jowett | 279/19 X |
| 3,525,531 | 8/1970 | Ekstrom et al. | 279/19.6 |
| 3,885,634 | 5/1975 | Goppen et al. | 173/104 |
| 3,910,590 | 10/1975 | Ekstrom | 279/19.1 |

*Primary Examiner*—Lawrence J. Staab
*Attorney, Agent, or Firm*—Holman & Stern

[57] ABSTRACT

A pneumatic hammer is an impact tool to be used in the construction industry and in mechanical engineering for chipping metal, scaling welds and chipping castings. The pneumatic hammer comprises a housing accommodating a barrel axially movable relative thereto, and a hood which is axially biased by a spring. The barrel is adapted to receive a tool having a non-circular cross-section. The hood has a non-circular hole for passage of the tool. Intermediate members are disposed between the hood and the tool and are in contact with the tool and comprise bodies of revolution rotatably mounted in the hood. The intermediate members define the non-circular hole of the hood, the shape of the hole corresponding to the cross-sectional shape of the tool. With such construction, the sliding friction between the tool and the side wall of the hood is replaced by the rolling friction between the tool and the intermediate members thereby reducing vibrations and lowering heating of the tool.

5 Claims, 5 Drawing Figures

PNEUMATIC HAMMER

The invention relates to impact tools, and more specifically to pneumatic hammers employed in various industries, and such as in the construction industry and mechanical engineering for chipping metal, scaling welds, chipping castings and treating metal parts for welding. This hammer is an improvement of the pneumatic hammer as disclosed in U.S. Pat. No. 3,885,634.

In the above-numbered U.S. Patent, there is disclosed a pneumatic hammer comprising: a housing; a barrel mounted for axial movement in the housing and adapted to receive a tool having a collar; a hammer piston disposed in the barrel and cooperating, under the action of compressed air, with the tool; a device for holding the tool including a lock rotatably mounted on the barrel and having a non-circular hole for passage of the tool and a pin on the side wall thereof, as well as a hood mounted in the housing and axially biased by a spring. The hood embraces the lock with an annular space therebetween and has a non-circular hole in the forward end portion thereof. The side wall of the hood has a circular slot; and longitudinal slots the longitudinal slots communicating with circular slot and receiving the lock pin. The pneumatic hammer so constructed provides for the protection of the left hand of the operator, control of the tool during operation and complete safety.

However, the operation of the pneumatic hammer of the above type revealed that the side wall of the hood having the non-circular hole therein is in permanent contact with the periphery of the tool. As a result, under the action of friction, especially with a strong pressure applied to the hood in the radial direction, the tool may be overheated thus resulting in the loss of strength and bending thereof, as well as in excessive wear of the side wall of the hood. In addition, in the zone of contact of the tool with the side wall of the hood, vibrations can be transmitted from the tool to the hood, hence to the operator's hand upon occurences of peak radial force application to the hood. The intensity of transmission of the vibrations is also associated with strong friction in this zone.

Furthermore, the provision of a non-circular hole in the foreward end portion of the hood produces difficulties in the manufacture of the hammer.

It is an object of the invention to provide a pneumatic hammer in which any direct contact of the peripheral surface of the tool with the side wall of the forward end portion of the hood is eliminated thus reducing transmission of vibrations to the operator through the hood, as well as to simplify the manufacture and to reduce wear of the hood.

With these and other objects in view, in a pneumatic hammer comprising a housing, a barrel mounted for axial movement in the housing and adapted to receive a tool having a collar, a hammer piston disposed in the barrel and cooperating, under the action of compressed air, with the tool, a device for holding the tool including a lock rotatably mounted on the barrel, having a non-circular hole for passage of the tool and a pin on the side wall thereof, as well as a hood mounted in the housing and axially biased by a spring, the hood embracing the lock with an annular space therebetween, having a non-circular hole on the side of insertion of the tool and a side wall having a circular slot and longitudinal slots communicating with the circular slot, the slots receiving the lock pin, according to the invention, there are provided intermediate members disposed between the forward end portion of the hood and the tool which are in contact with the tool, which comprise bodies of revolution rotatably mounted in the hood, and define the non-circular hole of the hood, the shape of the hole corresponding to the cross-sectional shape of the tool.

The provision of the intermediate members comprising bodies of revolution between the hood and the tool lowers transmission of vibrations to the hood, hence to the hands of the operator, from the tool in which high-frequency vibrations are induced from high stresses occurring in the tool upon every impact, as well as low-frequency vibrations from reciprocations of the tool which are due to the recoil of the tool from a workpiece as a result of elastic deformations.

Since the intermediate members are mounted for rotation, the sliding friction between the tool and the hood is replaced by the rolling friction which is much lower.

It is known that with the reduction of friction, the transmission of vibrations is also reduced. In addition, the reduction of friction results in lower heating of the hood and tool thus eliminating rapid wear of the hood and loss of strength and bending of the tool.

The intermediate members preferably comprise rollers radially protruding from the hood beyond the limits of the side wall thereof.

In accordance with one embodiment of the invention, the rollers are arranged in a criss-cross pattern in at least two axially spaced planes. This construction enables simplification of the manufacture of the hood and facilitates the repair thereof which is reduced to replacement of the rollers.

In accordance with another embodiment of the invention, the intermediate members are mounted in an insert which is replaceably fixed in the hood. This provides for further simplification of the manufacture and repair of the hammer. The inserts may be manufactured with the rollers separately and may be included in the hammer set as spares.

The invention is further characterized in that the insert is mounted in a sleeve made of a polymeric material which forms a part of the hood. Since it is common knowledge that the lowest intensity of vibrations transmission occurs when vibrations are transmitted through material exhibiting elevated thermal conductance, the provision of a part of the hood comprising a polymeric sleeve having low thermal conductance enables the reduction of vibrations transmission to the operator, and this facility, in combination with the above structural measures, provides a highly efficient pneumatic hammer.

Therefore, the pneumatic hammer according to the invention has the following advantages when compared to the prior art:

vibrations transmission to the left hand of the operator is lowered;

reliability of the hammer is improved and life of the tool is prolonged;

the manufacture of the hammer is simplified, because the non-circular opening of the hood is defined by the intermediate members;

the repair of the hood is facilitated since it is only the insert with the intermediate members which is to be replaced, whereas the hood itself, which has milled slots in the side wall need not to be replaced.

The invention will now be described with reference to specific embodiments of the pneumatic hammer illustrated in the accompanying drawings, in which.

Figure 1:
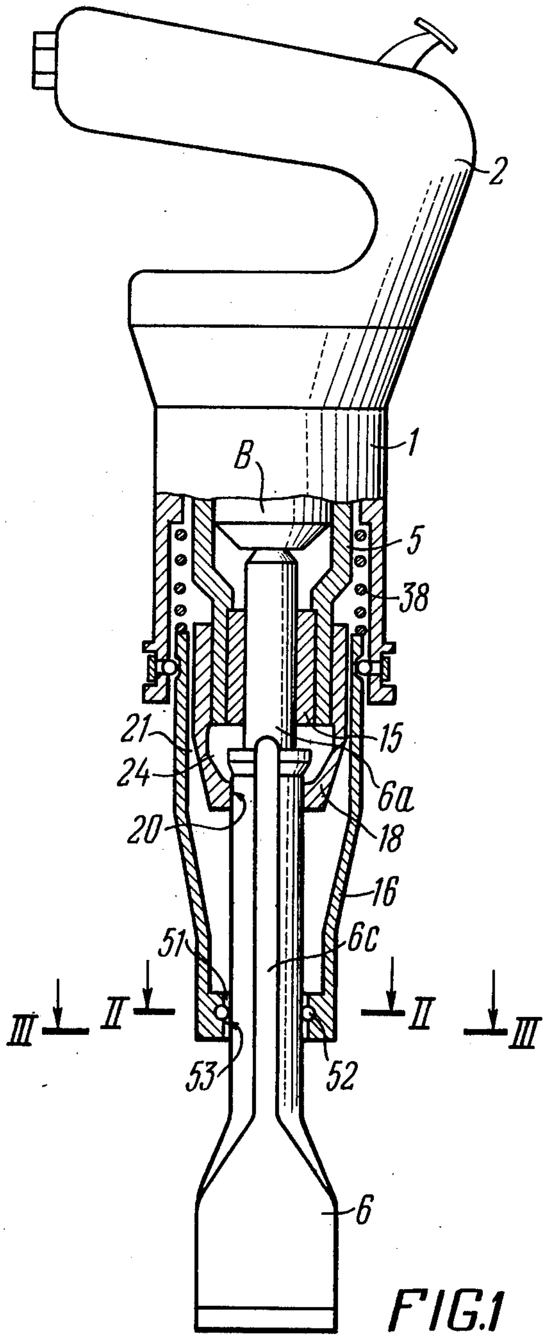
FIG. 1 shows a longitudinal sectional view of a pneumatic hammer according to the invention.

The pneumatic hammer comprises a housing 1 (FIG. 1) having a handle 2, the housing accommodating an axially movable barrel 5 having a guide sleeve 15. The guide sleeve 15 receives a tool 6 having a shank 6*a* and a collar 24.

Figure 3:
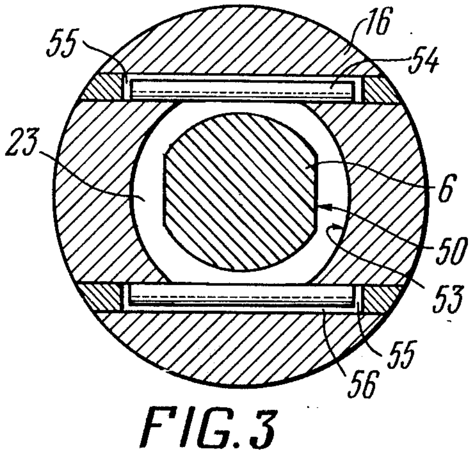
FIG. 3 is an enlarged sectional view taken along the line III—III in FIG. 1.
Figure 2:
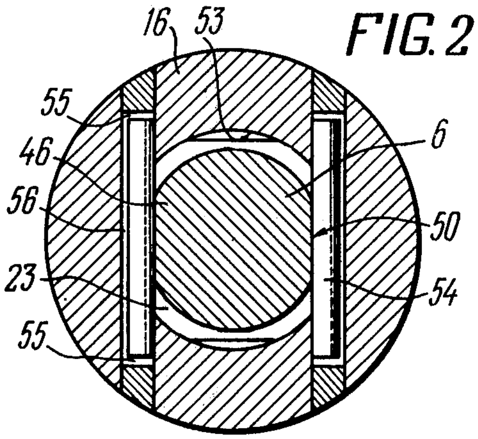
FIG. 2 is an enlarged sectional view taken along the line II—II in FIG. 1.

The tool 6 is of a non-circular cross-section within a working portion 6*c* which is located below the shank 6*a*, the non-circular cross-section being formed by flats 50 (FIGS. 2, 3).

A hammer piston B is disposed in the barrel 5 (FIG. 1) to cooperate with the tool 6 under the action of compressed air which is fed from an air-distribution device (not shown).

The pneumatic hammer has a device for holding the tool 6 which includes a lock 18 rotatably mounted on the barrel 5, the lock comprising a tubular member. The lock 18 has a non-circular hole 20 for passage of the tool 6 and a space for accommodation of the collar 24 of the tool 6.

In the lower portion of the housing 1, there is provided a hook 16 which is mounted for rotation and embraces the lock 18 so as to define an annular space 21 therebetween. The hood 16 is axially biased by a spring 38 and has a circular (transverse) slot 37 (FIGS. 4 and 5) and longitudinal slots 36 communicating with the circular slot, the slots receiving a pin 34 which is fixed to the lock 18 (FIG. 1).

In the forward end portion of hood 16, there is provided a hole 51 for passage of the tool 6, and the portion 6*c* of the tool having non-circular section is received in this hole 51.

The circular slot 37 (FIGS. 4, 5), longitudinal slots 36 and the pin 34 form, in combination, the device for locking the tool 6 in the hammer so as to fix the relative position of the hood 16 (FIG. 1) and the lock 18.

According to the invention, there are provided intermediate members 52 between the forward end portion of the hood 16 and the tool 6, the intermediate members eliminating the contact of the tool 6 with the side wall 53 of the hood 16 which defines the hole 51 of the hood. The intermediate members 52 comprise bodies of revolution, such as rollers 54 (FIGS. 2, 3) or cylindrical rods, and are in contact with the peripheral surface of the tool 6.

The rollers 54 are rotatably mounted in the hood 16 and define a non-circular hole 23 wit in the hole 51 of the hood 16, the shape of the hole corresponding to the cross-sectional shape of the portion 6*c* of the tool 6.

The rollers 54 are mounted in open transverse holes 55, the holes 55 intersecting the hole 51 of the hood 16 so that the middle portions of the holes 55 define recesses 56 (FIGS. 2, 3) which are open into the hole 51.

The rollers 54 are loosely mounted in the holes 55 so that they are rotatable; furthermore, with such an arrangement, the rollers 54 radially protrude from the hood 16 beyond the limits of the side wall 53 of the hood as shown in FIGS. 1 to 5.

In accordance with one embodiment of the invention, the rollers 54 are arranged in two or several axially spaced planes the rollers 54 defining a criss-cross pattern; thus, the rollers of one plane may be arranged perpendicularly to the rollers arranged in another plane as shown in FIGS. 2 and 3.

In accordance with another embodiment of the invention, there is provided an insert 57 in the hole 51 of the hood 16 (FIG. 4), the insert being secured in the hole of the hood 16 by any appropriate method so that it can be replaced by another insert. The insert 57 is provided with the intermediate members 52 or rollers 54 (FIG. 5) as described above.

Furthermore, the hood 16 (FIG. 5) may be made composite of two parts 58 and 59 of which one part 58 is fixed to the housing 1 and the other part 59 is made in the form of a sleeve of a polymeric material and is secured to the part 58 of the hood by any appropriate method. The sleeve may be provided with an internal annular groove for accommodation of the insert 57 having the rollers 54.

The pneumatic hammer functions in the following manner.

For insertion of the tool 6 (FIG. 1), the operator presses upon the hood 16 to move it towards the housing 1. The pin 34 (FIG. 4) of the lock 18 thus leaves the longitudinal slot 35 and enters the circular slot 37. The operator then rotates the hood 16 about the longitudinal axis of the hammer until the pin 34 takes the extreme fixed position in the circular slot 37. The operator subsequently freely introduces the tool 6 through the non-circular hole 23 of the hood 16 (FIGS. 2, 3) defined by the rollers 54 and through the non-circular hole 20 of the lock 18 (FIG. 1).

Then the operator rotates the hood 16 in the opposite direction and releases it from the axial pressure to permit the hood 16 to return back into the working position under the action of the spring 38, and in this position, the pin 34 (FIG. 4) is again received in one of the longitudinal slots 36.

Then the operator feeds compressed air from the air-distribution device (not shown) in FIG. 1, and the hammer piston B is reciprocated to cooperate with the shank 6*a* of the tool 6 and to cause the tool to reciprocate in the barrel 5 and in the hole 23 of the hood 16 in which the tool 6 cooperates with the rollers 54 (FIGS. 2, 3). It is noted that due to the fact that the rollers 54 radially protrude from the hood 16 inwardly beyond the limits of the side wall 53 of the hood 16, and the rollers 54 are mounted for rotation, the sliding friction between the tool 6 and the side wall 53 of the hood 16 is replaced by the rolling friction between the tool 6 and the rollers 54. This facility contributes to reduction of vibrations transmission from the tool to the operator's hand through the hood 16 of the hammer. In addition, the reliability of the hammer is improved and the tool life is prolonged.

Figure 4:
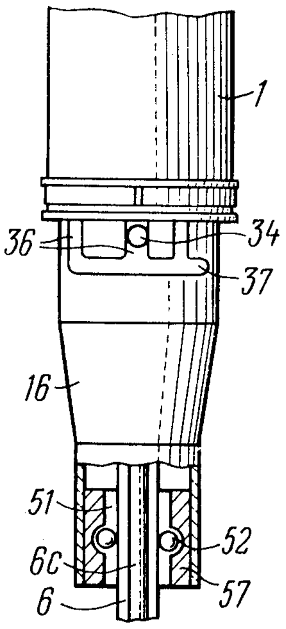
FIG. 4 shows an embodiment of the pneumatic hammer with the insert.
Figure 5:
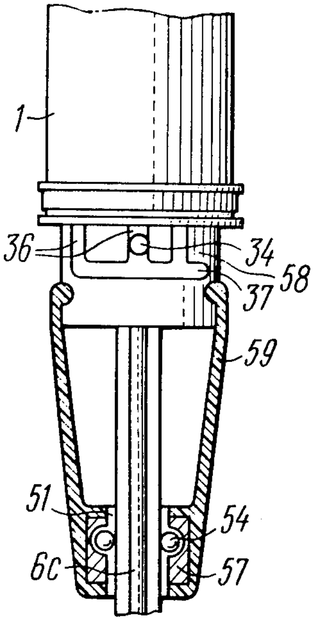
FIG. 5 shows an embodiment of the pneumatic hammer with the sleeve.

The pneumatic hammers having the hoods 16 made as shown in FIGS. 4 and 5 function in the same manner as described above. It is noted that the structural embodiment of the pneumatic tool shown in FIG. 5 provides for substantial reduction of heat removal from the hand to the hood which is known to lower the probability of affection by vibration disease without using additional thermal protection.

What is claimed is:

1. In a pneumatic hammer comprising: a housing; a barrel having a forward end portion and mounted in said housing for axial movement relative thereto; a tool having a working portion, a shank, and a collar, said working portion of the tool being of non-circular cross-section; an air-distribution device; a hammer piston cooperating with the shank of said tool for causing reciprocations of the tool; a guide sleeve secured in the forward end portion of said barrel; a hood mounted in said housing and having a forward end portion; means for holding said tool from falling out, said means comprising a lock rotatably mounted on the forward end portion of said barrel, said lock having a non-circular hole for passage of said tool; said hood being rotatably mounted in said housing and embracing said lock with an annular space therebetween; a non-circular hole in the forward end portion of said hood, the shape of the hole of said hood corresponding to the non-circular cross-sectional shape of the working portion of said tool; means for locking said tool in the hammer enabling the fixation of relative angular position of said hood and lock; an improvement wherein said hammer further comprises intermediate members disposed between the forward end portion of said hood and said tool, said members being in contact with the tool, and said members comprise bodies of revolution rotatably mounted in said hood defining said non-circular hole of the hood.

2. The improvement according to claim 1, wherein the intermediate members comprise rollers inwardly protruding beyond the limits of the side wall of said hood.

3. The improvement according to claim 2, wherein the rollers are arranged in criss-cross pattern in at least two axially spaced planes.

4. The improvement according to claim 1, wherein the intermediate members are mounted in an insert which is replaceably fixed in the hood.

5. The improvement according to claim 4, wherein the insert is fixed in a sleeve made of a polymeric material which forms the front end part of the hood.

* * * * *